(12) United States Patent
Kebbede et al.

(10) Patent No.: US 6,820,334 B2
(45) Date of Patent: Nov. 23, 2004

(54) METHOD FOR REPAIRING ARTICLES OF CERAMIC COMPOSITES

(75) Inventors: Anteneh Kebbede, Albany, NY (US); Milivoj Konstantin Brun, Ballston Lake, NY (US); Krishan Lal Luthra, Niskayuna, NY (US); Henry Charles McGuigan, Duanesburg, NY (US)

(73) Assignee: General Electric Company, Niskayuna, NY (US)

( * ) Notice: Subject to any disclaimer, the term of this patent is extended or adjusted under 35 U.S.C. 154(b) by 265 days.

(21) Appl. No.: 10/063,404

(22) Filed: Apr. 19, 2002

(65) Prior Publication Data

US 2003/0196305 A1 Oct. 23, 2003

(51) Int. Cl.$^7$ ................................................ B23P 15/00
(52) U.S. Cl. ..................................................... 29/889.1
(58) Field of Search .......................... 29/889.1, 402.09, 29/402.11; 156/94, 98; 501/95.1, 94

(56) References Cited

U.S. PATENT DOCUMENTS

| | | | | |
|---|---|---|---|---|
| 4,507,011 A | * | 3/1985 | Brown | 403/404 |
| 4,737,330 A | * | 4/1988 | Rau | 264/138 |
| 4,793,879 A | * | 12/1988 | Mimbs | 156/98 |
| 4,861,643 A | * | 8/1989 | Scollard | 428/162 |
| 4,889,686 A | | 12/1989 | Singh et al. | |
| 4,916,880 A | * | 4/1990 | Westerman, Jr. | 52/514 |
| 4,944,904 A | | 7/1990 | Singh et al. | |
| 5,023,987 A | * | 6/1991 | Wuepper et al. | 29/402.11 |
| 5,053,175 A | * | 10/1991 | Birchall et al. | 264/641 |
| 5,093,171 A | * | 3/1992 | Sheahan | 428/61 |
| 5,154,787 A | | 10/1992 | Gardner et al. | |
| 5,177,039 A | | 1/1993 | Allaire et al. | |
| 5,230,951 A | * | 7/1993 | Birchall et al. | 428/293.4 |
| 5,269,338 A | * | 12/1993 | Figas | 137/140 |
| 5,350,447 A | * | 9/1994 | Copes | 106/287.17 |
| 5,378,500 A | * | 1/1995 | Ward-Close et al. | 427/250 |
| 5,459,114 A | * | 10/1995 | Kaya et al. | 501/95.2 |
| 5,855,828 A | * | 1/1999 | Tuffias et al. | 264/29.1 |
| 5,856,252 A | * | 1/1999 | Lange et al. | 501/95.2 |
| 5,928,448 A | * | 7/1999 | Daws | 156/98 |

* cited by examiner

*Primary Examiner*—Icuda Rosenbaum
(74) *Attorney, Agent, or Firm*—Toan P. Vo; Patrick K. Patnode

(57) ABSTRACT

A method for repairing an article made of a fiber-reinforced ceramic matrix composite comprises attaching sections of a fiber-reinforced tape to the damaged area and then infiltrating the sections with the ceramic matrix or ceramic matrix precursor material. The material around the damaged area may be removed first to form a depression that is then filled with sections of the fiber-reinforced tape and further infiltrated with the ceramic matrix or ceramic matrix precursor material. The repaired article shows stress-strain curve similar to a defect-free article.

36 Claims, 5 Drawing Sheets

- Parent Material
- Repair Material

METHOD FOR REPAIRING ARTICLES OF CERAMIC COMPOSITES

BACKGROUND OF INVENTION

The present invention relates to a method for repairing articles made of ceramic composites. In particular, the present invention relates to a method for repairing articles made of fiber-reinforced ceramic composites.

Reinforced ceramic matrix composites ("CMCs") comprising fibers dispersed in continuous ceramic matrices of the same or a different composition are well suited for structural applications because of their toughness, thermal resistance, high-temperature strength, and chemical stability. Such composites typically have high strength-to-weight ratio that renders them attractive in applications in which weight is a concern, such as in aeronautic applications. Their stability at high temperatures renders them very suitable in applications in which the components are in contact with a high-temperature gas, such as in gas turbine engine.

One process for the production of CMCs begins with producing a prepreg tape comprising fibers and a ceramic matrix or matrix precursor material. Fibers, such as ceramic fibers that have been coated with one or more materials to impart certain desired surface properties to them, are impregnated with a suspension comprising powder of the ceramic matrix or matrix precursor material and a temporary binder, and typically wound onto a drum to form the prepreg tape. The prepreg tape is dried and then cut into sections and formed into a fiber preform which is a porous object having a desired shape. The dried prepreg tape is still flexible and can be easily shaped. In another process, the preform is made first using tapes of woven fibers or fibers woven into three-dimensional structures, and fiber coatings are applied by chemical vapor infiltration. The porosity within the fiber preform is then filled with the matrix or matrix precursor material, which in many instances may be a molten metal such as silicon, which eventually produces the finished continuous ceramic matrix surrounding the fibers. SiC fibers have been used as a reinforcing material for ceramics such as SiC, TiC, $Si_3N_4$, or $Al_2O_3$. The filling of the fiber preform with the matrix precursor material and any attendant reaction between the matrix constituents already in the preform and the precursor material serve to densify the shaped object. This filling or densification may be achieved by chemical-vapor infiltration ("CVI") or liquid-phase infiltration by the matrix precursor material. Liquid-phase infiltration, often by a molten metal, is the preferred method because it is less time consuming and more often produces a fully dense body than the CVI process. Full densification is necessary to achieve good thermal and mechanical properties and, thus, a long-term performance of CMCs.

Polymer infiltration and pyrolysis ("PIP") is another process for the production of CMCs. This process consists of: (1) infiltration of the composite reinforcement preform with one or more organo-metallic polymers, (2) densification or consolidation of the polymer-impregnated reinforcement preform, (3) cure of the polymer matrix to prevent melting during subsequent processing, and (4) pyrolysis and conversion of the cured polymer or polymers into the ceramic matrix. The polymer infiltration of a preform can be accomplished by either solution infiltration or melt infiltration. Ceramic composite matrices, such as SiC, $Si_3N_4$, $SiON_2$, BN, AlN, and mixtures thereof, can be prepared from the pyrolysis of respective precursor polymers.

CMCs are quite expensive because their typical production process is rather involved. Therefore, it is desirable to have a method of repairing any CMC pieces, which may be damaged either accidentally or during use, such that they may be salvaged or their useful life may be extended.

SUMMARY OF INVENTION

A method is provided for repairing an article that comprises a fiber-reinforced ceramic matrix composite ("CMC") material. The CMC comprises fibers embedded in a ceramic matrix material. The method comprises: (a) providing a repairing tape that comprises reinforcement fibers and at least one material selected from the group consisting of a ceramic matrix material, a ceramic matrix precursor material, and mixtures thereof; (b) attaching a portion of the repairing tape to a damaged area of the article; (c) providing an infiltrant phase material comprising at least a material selected from the group consisting of a ceramic matrix material, a ceramic matrix precursor material, and mixtures thereof to the repairing tape portion attached to the damaged area; (d) infiltrating at least the repairing tape portion with the infiltrant phase material to form a repaired area having a fiber-reinforced CMC composition.

In one aspect of the present invention, a portion of the material around the damaged area is removed before a portion of the repairing tape is attached thereto.

In another aspect of the present invention, the portion of the repairing tape attached to the damaged area comprises a plurality of layers of the repairing tape.

Other aspects, advantages, and salient features of the present invention will become apparent from a perusal of the following detailed description, which, when taken in conjunction with the accompanying figures, discloses embodiments of the present invention.

DETAILED DESCRIPTION

Figure 1:
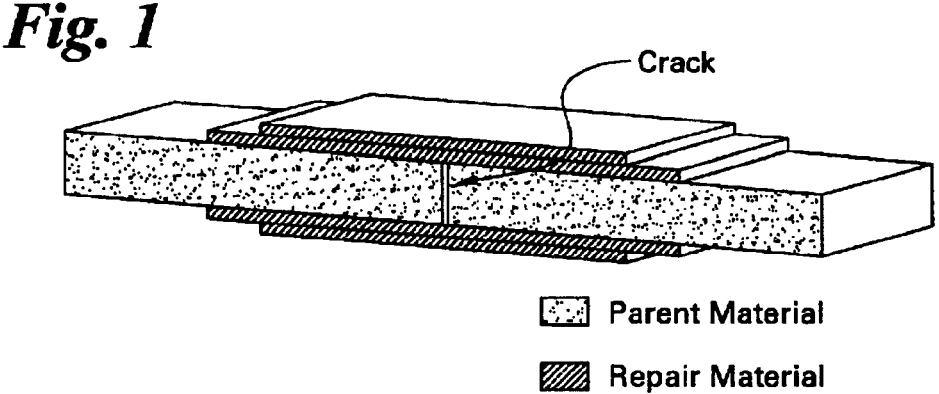
FIG. 1 shows schematically a crack in a CMC article repaired by patches of prepreg tape.

As used herein, the terms "fiber" or "fibers" include fibers, filaments, whiskers, tows, cloth, mat or felt, and combinations thereof. Fibers suitable for used in the present invention are selected from the group consisting of elemental carbon, silicon carbide, silicon nitride, fibers made of inorganic oxide materials, and combinations thereof. "Ceramic matrix precursor material" means a material that can be converted to ceramic matrix material. Such a conversion may be of physical or chemical nature. Non-limiting examples of physical conversion are alloying and forming a solid solution. Non-limiting examples of chemical conversion are decomposition, chemical transformation, and chemical reaction.

SiC fiber-SiC CMCs have been used in forming components exposed to hot combustion gas in aircraft engines and gas turbines, such as shrouds, combustor liners, nozzles, buckets, blades, and vanes. An important characteristic of CMCs that favors their use in these applications is their high toughness behavior which is characterized by a rising stress-strain curve after the initial matrix cracking in the material.

In service, gas turbine components operate at temperatures frequently exceeding 1200° C. and are subjected to significant temperature gradients. In addition, these components are exposed to impact loading from particles having high velocity that are entrained in the hot gases. The severe service conditions render these components prone to various types of damage. Large thermal gradients can initiate cracks at component edges or joint areas. Damages by foreign objects such as high-speed entrained particles can result in holes, indentations, or cracks that can propagate. The method of the present invention for repairing damages in gas turbine engine components made of CMCs can extend the life of these components. In addition, the method of the present invention can repair damages in newly-manufactured components and, thus, reduce the number of defective or off-specification components. The method of the present invention provides repaired components that exhibit toughness behavior similar to newly-manufactured defect-free components.

The method of the present invention for repairing articles made of CMCs comprises: (a) providing a repairing tape that comprises reinforcement fibers and at least one material selected from the group consisting of a ceramic matrix material, a ceramic matrix precursor material, and mixtures thereof; (b) attaching a portion of the repairing tape to a damaged area of the article; (c) providing a infiltrant phase material comprising at least a material selected from the group consisting of a ceramic matrix material, a ceramic matrix precursor material, and mixtures thereof to the repairing tape portion attached to the damaged area; (d) infiltrating at least the repairing tape portion with the infiltrant phase material to form a repaired area having a fiber-reinforced CMC composition. The term "infiltrant phase material" means a material that, during processing, fills or participates in the filling of the space around the fibers.

In one preferred embodiment, the fibers comprise silicon carbide. Reference herein to fibers of silicon carbide includes single-crystal or polycrystalline fibers, or wherein silicon carbide envelops a core of another material, such as carbon or tungsten. The fibers may also comprise organic precursors that will be transformed into silicon carbide at a temperature within the range of temperatures experienced during the fabrication process. Such fibers may also include elements other than silicon and carbon. Examples of known silicon carbide fibers include Hi-Nicalon™ and Hi-Nicalon-S™ silicon carbide fibers available from Nippon Carbon, Japan; Sylramic™ silicon carbide fibers available from Dow Corning, Mich. and Composites Optics, Inc., San Diego, Calif.; the Tyranno family of fibers available from UBE Industries, Japan; and fibers having the trade name SC-0, SCS-6 or SCS-9 produced by Textron, Mass.

The repair method of the present invention is applicable for the repair of articles of CMC material that are made by any method of CMC production. For example, a CMC article may be made by the prepreg/melt infiltration, prepreg/CVI, slurry cast, slurry cast/melt infiltration, slurry cast/CVI, PIP, or combinations thereof.

For example, in the prepreg/melt infiltration method, ceramic composites articles are formed which comprise a porous fiber preform comprising ceramic fibers and matrix material (together, a "fiber preform") and an infiltrant. Typically, the ceramic fibers form a network of reinforcement bodies for the composite and are surrounded by the matrix and the infiltrant. The ceramic fiber preform is porous because although some matrix or matrix precursor material may have been provided with the fibers, there still is space between the fibers (inter-fibrillar spaces or regions). These inter-fibrillar regions are filled with an infiltrant in the process of producing the ceramic composite. The infiltrant can also react with matrix precursors. Generally, the fibers range from about 0.3 micron to about 150 microns in diameter, and about 100 m or longer in length. The fibers can be used as a continuous filament or as discontinuous fibers, which frequently have an aspect ratio of at least 10 and as high as 1000 or more. The shaped fiber preform may be made by a number of manners. In addition to preforms made with continuous fibers, low aspect-ratio fibers may be mixed with a particulates of ceramic matrix material or ceramic matrix precursor material and a binder, such as an organic resin, a cellulosic material, or a combination thereof, and formed into a desired shape.

The mixture can be formed or shaped into a preform or compact by a number of known techniques. For example, it can be extruded, injection molded, die-pressed, isostatically pressed, or slip cast to produce the preform of desired shape and size. Preferably, the preform is of the shape and size of the finished composite article.

Alternatively, the fiber is continuous and as long as desired. Continuous fibers impregnated with a suspension comprising the matrix or matrix precursor material can be filament-wound around a stable formed support to build the preform having desired shape and thickness. Such impregnated continuous fibers may also be formed first into prepreg sheets or tapes by placing long lengths of fibers next to and parallel to one another. Such prepreg sheets or tapes can consist of single or multiple layers of filaments. Continuous filaments can also be woven, braided, or otherwise arrayed into desired configurations. Portions of the fiber sheets or tapes may be disposed around the stable formed support to build up a fiber preform having desired shape and thickness. When the composite desirably has a continuous SiC matrix, an organic resin or carbon particles may be introduced into the fiber tows before they are made into prepreg tapes and formed into shape. As used herein, the term "carbon particles" or "carbon particulates" includes, but is not limited to, particles, flakes, whiskers, or fibers of amorphous, single crystal, polycrystalline carbon, graphite, carbonized plant fibers, lamp black, finely divided coal, charcoal, and carbonized polymer fibers or felt such as rayon, polyacrylonitrile, and polyacetylene.

The fibers may be advantageously coated with a compound that renders them unreactive toward one or more of the molten precursors of the ceramic matrix materials. In one aspect of the present invention, the fibers are SiC fibers coated with a nitride coating, such as boron nitride or silicon-doped boron nitride. Other coating materials can be metal nitrides, such as aluminum nitride or silicon nitride, chosen for the particular application. The coating can prevent a substantial degradation of the fibers when they must be exposed to the molten precursors of the ceramic matrix materials for an extended period of time. Coatings may also be applied to impart a superior debonding characteristic of the fibers in the final composite under severe stress conditions. The nitride coating can be deposited by methods well known in the art for depositing a continuous coating without damaging the fiber. Coating processes such as chemical vapor deposition or physical vapor deposition processes, such as sputtering, are suitable. Generally the chemical vapor deposition of the nitride compound is carried out at temperatures ranging from about 900° C. to about 1800° C. in a partial vacuum with the particular processing conditions being known in the art or determinable empirically. The nitride coating is at least sufficiently thick to be continuous and free of significant porosity. Coating thickness can range from about 0.1 micron to about 5 microns, and typically it is about 1 micron for fibers of about 8 to 15 microns in diameter. The coating thickness should be sufficient to prevent reaction, or prevent significant reaction, between the fibers and the infiltrating precursors of the ceramic matrix materials under the particular processing conditions used. In the case of a composite of SiC fibers in a SiC matrix, the precursor of the ceramic matrix material is typically silicon. During the infiltration process, the nitride coating may or may not react with or dissolve in the molten silicon depending on the time and temperature; i.e., the nitride coating will survive better at lower temperatures and for shorter times of infiltration. Generally, silicon infiltration time increases with the size of the preform. Therefore, larger-sized preforms may require thicker nitride coatings. The reinforcement fibers may be coated with more than one coating, each comprising a different material. Alternatively, the coating composition may be graded continuously across the thickness of the coating. Such a graded coating can be made by varying the composition of the reactants during the deposition.

Optionally, the nitride-coated fibers can be coated with a second continuous coating selected from the group consisting of carbon and metals that react with silicon to form a silicide, metal carbide, metal silicide, metal nitride, and metal boride, on the nitride coating. The metal carbide may be a carbide of silicon, tantalum, titanium, or tungsten. The metal silicide my be a silicide of chromium, molybdenum, tantalum, titanium, tungsten, or zirconium. The nitride may be a nitride of silicon, aluminum, titanium, zirconium, hafnium, niobium, tantalum, or boron. The metal boride may be a diboride of titanium, zirconium, halfnium, or aluminum.

The outer coating of the fibers can promote wetting to improve the infiltration by capillarity, provide a desirable debonding with the matrix, or reduce the reaction between the matrix and the fiber during high temperature service. Moreover, the fibers may also be coated with a material that renders them readily wettable by the molten precursor of the ceramic matrix material.

A ceramic matrix material or a precursor thereof is applied directly or indirectly to the surface of the fiber preform. An indirect application may be effected by a wicking action. When the ceramic composite comprises a SiC continuous phase, the precursor is silicon. For example, silicon powder may be applied directly on the surface of the fiber preform. Alternatively, molten silicon may be supplied to the surface of the fiber preform by a wicking action. The fiber preform with the ceramic matrix material or the precursor thereof is heated to a temperature greater than or equal to the melting point of the precursor of the ceramic matrix material in a vacuum, for example in a closed furnace. Preferably, the furnace is evacuated before the heating begins to avoid the entrapment of pockets of gas within the fiber preform. A vacuum in a range from about 1 Pa to about 300 Pa is typically adequate. Preferably, the vacuum is in a range from about 2 Pa to about 150 Pa.

Preferably, the furnace used for the infiltration process is a carbon furnace; i.e., a furnace the interior of which is constructed essentially from elemental carbon. Such a furnace reacts with any residual oxygen in the furnace atmosphere to produce CO or $CO_2$ that does not substantially react with the carbon support, the fiber preform, or the precursor of the ceramic matrix material. When a carbon furnace is not used, it is preferable to have a quantity of carbon disposed within the interior of the furnace so that it can react with any residual oxygen in the furnace atmosphere.

Infiltration is performed at greater than or equal to the melting point of the precursor of the ceramic matrix material. In the case of silicon, the infiltration temperature is in a range from about 1400° C. to about 1600° C., preferably from about 1415° C. to about 1500° C., more preferably from about 1425° C. to about 1450° C. Higher temperatures lower the viscosity of molten silicon and promote a better diffusion of the molten silicon into the fiber preform, but they can unnecessarily accelerate a degradation of the fibers.

CMC composite articles that can be repaired by the method of the present invention can also be made by other processes. For example, such composite articles can be made by the slurry casting method. Sheets of reinforcement fibers, which may be formed by weaving or braiding the fibers, are laid up to form a body. The fibers may be coated by a method such as CVI, as disclosed above. The body is placed in a mold, which is then filled with a slurry comprising particulate ceramic matrix material, ceramic matrix precursor material, or mixture thereof to form a preform. The preform is subsequently densified by melt infiltration or chemical vapor infiltration to form the final composite article.

Ceramic composite articles such as combustion chamber liners, combination combustor liners and transition pieces, nozzles, shroud rings, vanes, buckets, and blades can be made using the method of manufacturing described above. Damages in these ceramic composite articles, introduced during either their manufacture or their subsequent use, can be repaired by the method of the present invention.

The repair method of the present invention begins with providing a repairing tape comprising reinforcement fibers. A repairing tape can be a prepreg tape made of continuous fibers and by the prepreg process disclosed above. For example, when the preform is made by laying up layers of prepreg tape of impregnated continuous fibers, portions of such a prepreg tape can be used to repair the CMC article. Such a prepreg tape may also be used to repair CMC articles made by casting, extruding, molding, or pressing of mixture comprising reinforcement fibers and ceramic material. Alternatively, the repairing tape for the repair may be made by casting into thin tapes a mixture comprising short fibers and the matrix material or its precursor. A suitable method of casting the thin tape can be the doctor blade method. After a drying step, the repairing tape made by, for example, the prepreg method or tape casting, still has significant flexibility for attaching and conforming to the area around the damage. Generally, the repairing tape has a thickness ranging from about 25 micrometers to about 1300 micrometers, preferably ranging from about 125 micrometers to about 1000 micrometers, and more preferably from about 150 micrometers to about 400 micrometers.

The area around the damage may be advantageously cleaned by a mechanical or a chemical method before a portion of the repairing tape is attached thereto. For example, the damaged area may be abraded by a mechanical action. Alternatively, the CMC article may be treated in a reducing atmosphere to remove surface oxides from the surfaces of the CMC article. Such a reducing atmosphere may comprise a gas such as hydrogen, carbon monoxide, or mixtures of one of these gases with an inert gas (for example, nitrogen, argon, or helium). These cleaning actions promote a good adhesion between the repairing tape and the article and any subsequent inter-diffusion of materials therebetween.

In one embodiment of the present invention, material around the damage area is removed to form a depression in which pieces of repairing prepreg tape having appropriate shape, size, and composition can be positioned. The depression may take one of several different forms, such as cylinder, inverted prism, inverted cone, or inverted truncated cone. Preferably, the depression has the shape of an inverted prism or cone so that there is an overlap between load-carrying fibers in the original CMC article and the repair patch.

Prior to attaching a repairing tape to a surface of the damaged article or filling a depression with layers of the repairing tape, the cleaned surface around the damaged area or of the depression may be painted with a mixture comprising an adhesive and powder of the matrix material and/or matrix precursor material. The mixture may also include short segments of the reinforcement fibers, if desired. Alternatively, the cleaned wall of the tapered depression may be lined with a layer of the repairing tape before the depression is filled with a plurality of laid-up layers of the repairing tape. Such a preparation of the wall of the depression showed further improved adhesion between the repair patch and the original CMC article.

When the repairing tape attached on the CMC article comprises a binder, it is subject to a binder burn out at a temperature ranging up to about 750° C. Preferably a slow heating rate ranging from about 15° C. per hour to about 30° C. per hour is desirable to avoid a rapid escape of a large amount of gaseous decomposition products from the tape. The thermal decomposition is completed without leaving a significant deleterious residue. The thermal decomposition can be carried out at atmospheric pressure in an inert gas atmosphere, such as nitrogen, argon, or helium, or in a partial vacuum. Decomposition in a partial vacuum helps to remove decomposition products. Vacuum levels similar to those used in making the original CMC article may be used; for example, from about 1 Pa to about 300 Pa, preferably from about 2 Pa to about 150 Pa.

Following binder burnout, the repairing tape comprises a porous patch that can readily admit ceramic matrix or precursor infiltrant material. A powdered ceramic matrix precursor material is applied to the porous repairing patch, and the article is heated to slightly above the melting point of the ceramic matrix precursor material. When the matrix material is SiC, the precursor material comprises silicon. Molten silicon infiltrant readily reacts with residual carbon left from the organic binder decomposition or any carbonaceous particulate material supplied with the original fiber to form SiC continuous matrix surrounding the reinforcement fibers. Alternatively, molten silicon may be supplied to the porous repairing patch by a wicking action through, for example, a carbon cloth. The step of infiltration is preferably carried out in an atmosphere and in a carbon furnace similar to the manufacture of the original CMC article. Preferably, the infiltration is carried out in a vacuum. The chosen infiltration temperature depends on the infiltrant phase material and, in some instances, also on the history of the part to be repaired. The structural property of the areas of original CMC material is substantially preserved when the infiltration into the repairing patch is carried out at a temperature in the range of about 15–20° C. less than the infiltration temperature used during the manufacture of the original CMC article.

CMC articles that were repaired using the method of the present invention showed toughness behavior similar to that of the defect free articles characterized by a rising stress-strain curve past the initial matrix cracking point. In other words, the CMC articles repaired according to the method of the present invention did not fail catastrophically.

In the examples described below, the repair patch was cut from a composite tape that was prepared by a filament winding prepreg process. The fibers in the tape were Hi-Nicalon™ SiC fibers. The matrix in the green prepreg tape consisted essentially of a mixture of SiC powder, carbon powder, an organic binder (Butvar B-79 from Solutia, St. Louis, Mo.), and organic resins (a mixture of 50/50 weight percent of Furcarb LP340-E resin from Perstorp Chemitec Limited, Co., Durham, Great Britain and Cotronics 931 from Cotronics Corporation, Brooklyn, N.Y.). After going through binder burnout and silicon melt infiltration, the repair patch becomes a fiber-reinforced composite with a Si—SiC matrix.

EXAMPLE 1

Figure 3:
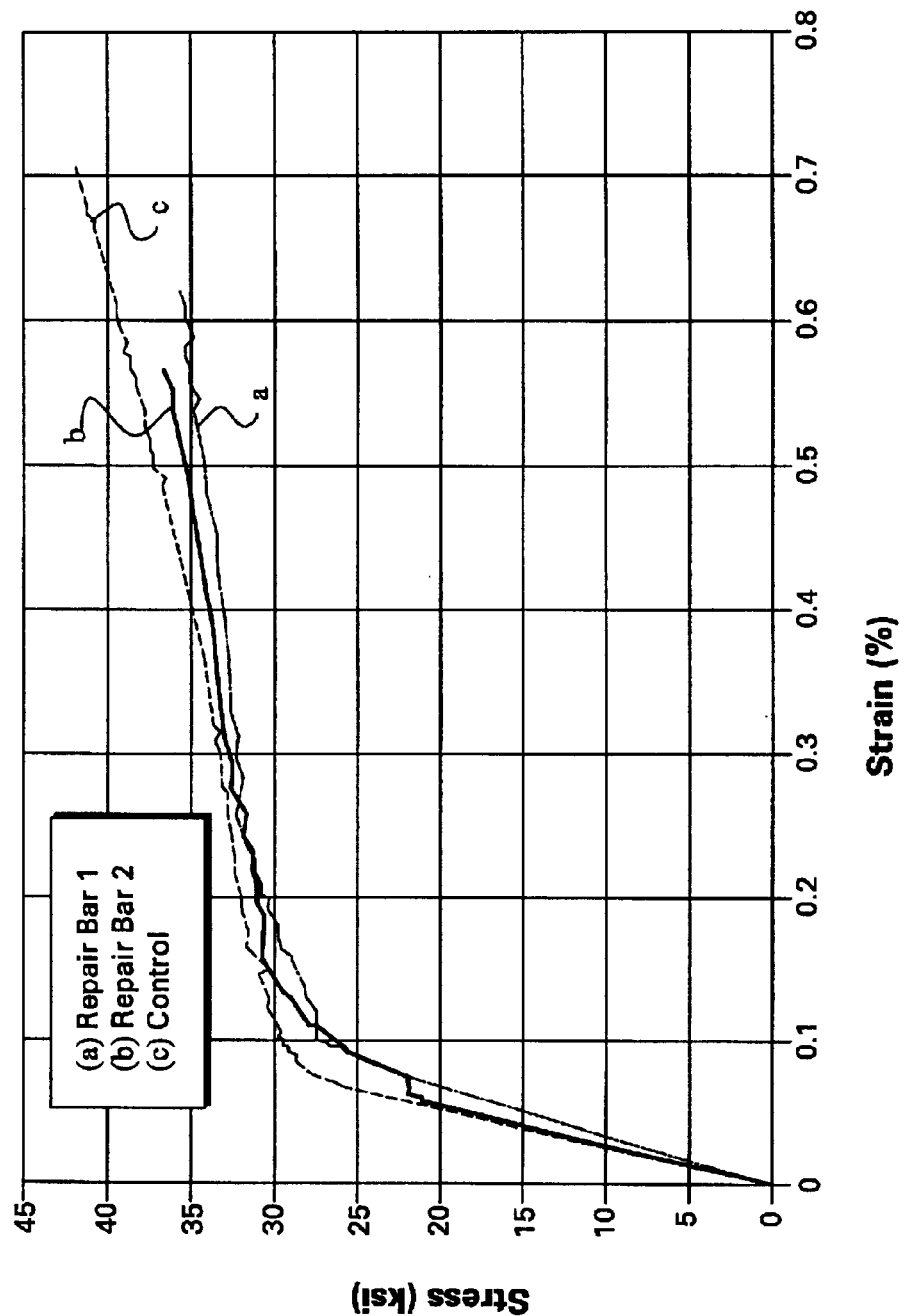
FIG. 3 shows the stress-strain curve of a CMC bar, which is made of melt-infiltrated prepreg Hi-Nicalon™ composite and repaired with Hi-Nicalon™ prepreg tape.

Repair by Applying an External Patch of Hi-Nicalon™ Fiber-Reinforced Prepreg Tape to a Melt-Infiltrated Prepreg Hi-Nicalon™ Composite Substrate A melt-infiltrated prepreg Hi-Nicalon™ SiC—SiC composite piece having a dimension of about 10 cm×2.5 cm×0.25 cm was cut from a large plate. Both surfaces of the piece were grit-blasted to remove residual layer of Si alloy metal that was left behind during the fabrication of the plate. The piece was cut into halves across its long dimension. The two halves were re-assembled. Two layers of sections of Hi-Nicalon™ prepreg tape were laid up on each of the surfaces of the piece and across the cut to cover an area about 2.5 cm on either side of the cut. The fibers in the prepreg tapes were aligned to be perpendicular to the cut in the bar. The patched piece was placed in a vacuum bag and autoclaved at 125° C. and a pressure of about 650 kPa to cure the resins in the patch and to create an intimate contact between the patch and the substrate. For binder burnout, the assembly of the piece and the repair patches was subjected to a slow heating to about 750° C. in vacuum in the range from about 15 to about 30 Pa, generated by a mechanical vacuum pump, with a soak time at the final temperature of about 30 minutes. A pack consisting of silicon, boron, and boron nitride powders was applied to the patch. The repair patch was then infiltrated with molten Si alloy by heating at about 1425° C. for about 20 minutes in vacuum. The repaired piece was cut to produce two 10 cm×1.2 cm bars. Both bars were subjected to a tensile test. The stress-strain curve for the repaired bars is shown in FIG. 3 in comparison to the stress-strain curve of another intact bar that was cut from the same parent plate. The repaired bars showed a toughness behavior similar to the intact bar, as demonstrated by similar stress-strain curves.

EXAMPLE 2

Figure 4:
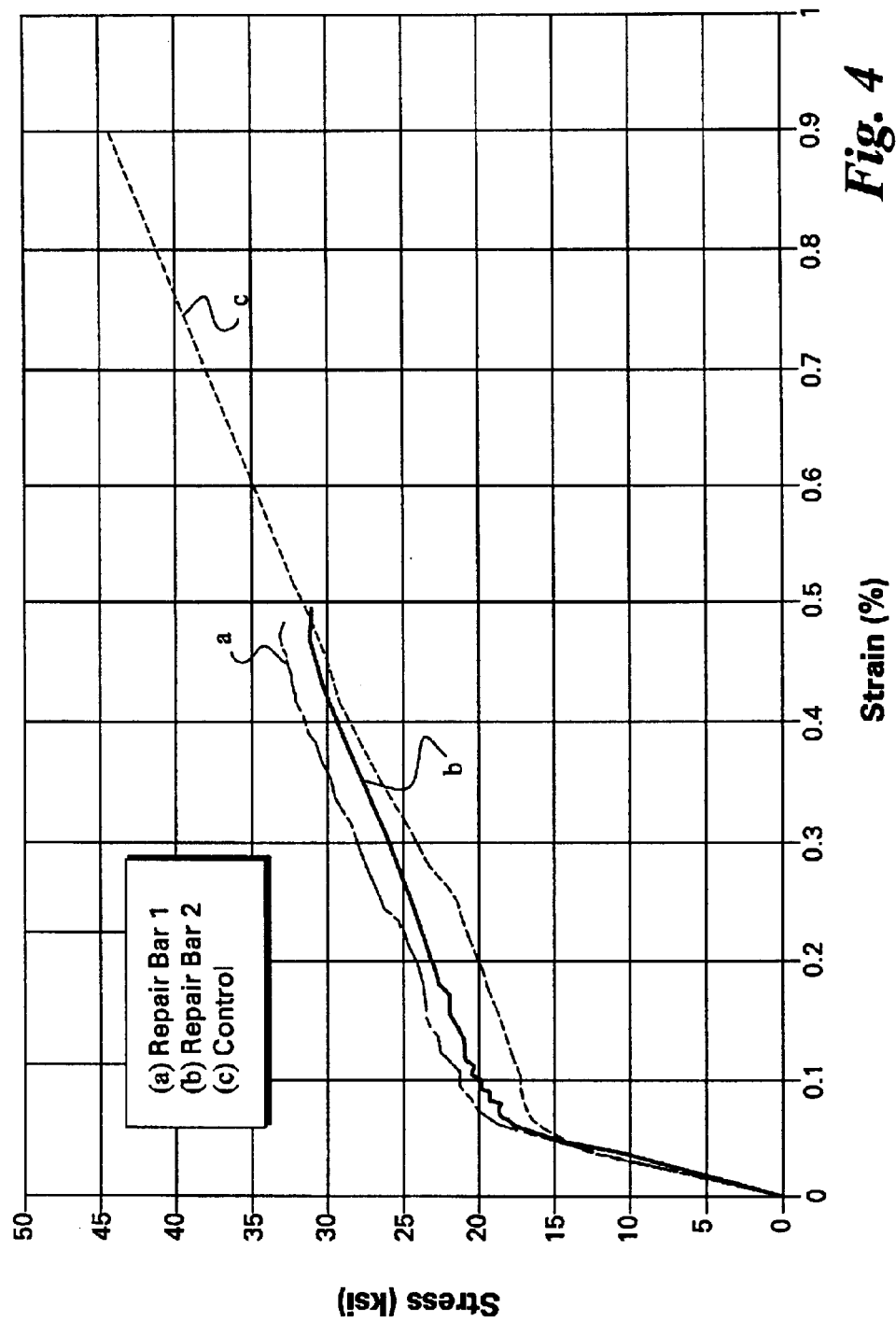
FIG. 4 shows the stress-strain curve of a CMC bar, which is made of melt-infiltrated slurry cast Tyranno-ZMI™ composite and repaired with Hi-Nicalon™ prepreg tape.

Repair by Applying an External Patch of Hi-Nicalon™ Fiber-Reinforced Prepreg Tape to a Melt-Infiltrated Slurry Cast Si—SiC Matrix Composite Reinforced with Tyranno-ZMI™ SiC Fibers Two melt-infiltrated slurry cast Tyranno-ZMI™ SiC—SiC composite bars, each having a dimension of about 10 cm×1.25 cm×0.25 cm, were cut from a large plate. The surfaces of one of the bars were grit-blasted to remove residual layer of metal that was left behind during the fabrication of the plate. The metal residue on the as-fabricated surfaces of the second bar was removed by grinding. Both bars were cut into halves across the long dimension. The two halves of each bar were re-assembled. Two layers of sections of Hi-Nicalon™ prepreg tape were laid up on each of the grit-blasted surfaces of the bar and across the cut to cover an area about 2.5 cm on either side of the cut. The fibers in the prepreg tapes were applied to surfaces of the bar as exhibited in FIG. 1 and aligned to be perpendicular to the cut in the bar. The patched bars were placed in a vacuum bag and autoclaved at 125° C. and a pressure of about 650 kPa to cure the resins in the patch and to create an intimate contact between the patch and the substrate. For binder burnout, the assembly of the bar and the repair patches was subjected to a slow heating to about 750° C. in vacuum with a soak time at the final temperature of about 30 minutes. A pack consisting of a mixture of silicon, boron, and boron nitride powders was applied to the patch. The repair patch was then infiltrated with molten Si alloy by heating at about 1435° C. for about 30 minutes in vacuum. Both bars were subjected to a tensile test. The stress-strain curve for the repaired bars is shown in FIG. 4 in comparison to the stress-strain curve of another intact bar cut from the same plate. The repaired bars showed a toughness behavior similar to the intact bar, as exhibited by the similar stress-strain curves.

EXAMPLE 3

Figure 2A:
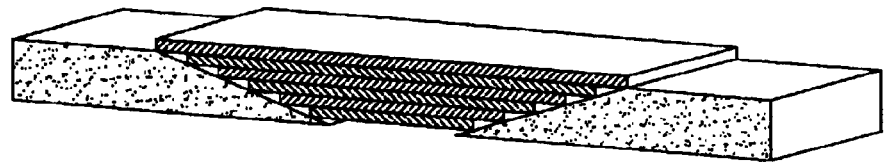
FIG. 2 shows schematically a damaged area repaired by a plug of a plurality of portions of prepreg tape.
Figure 2B:
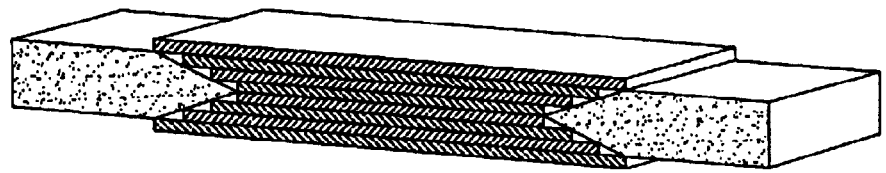
Figure 5:
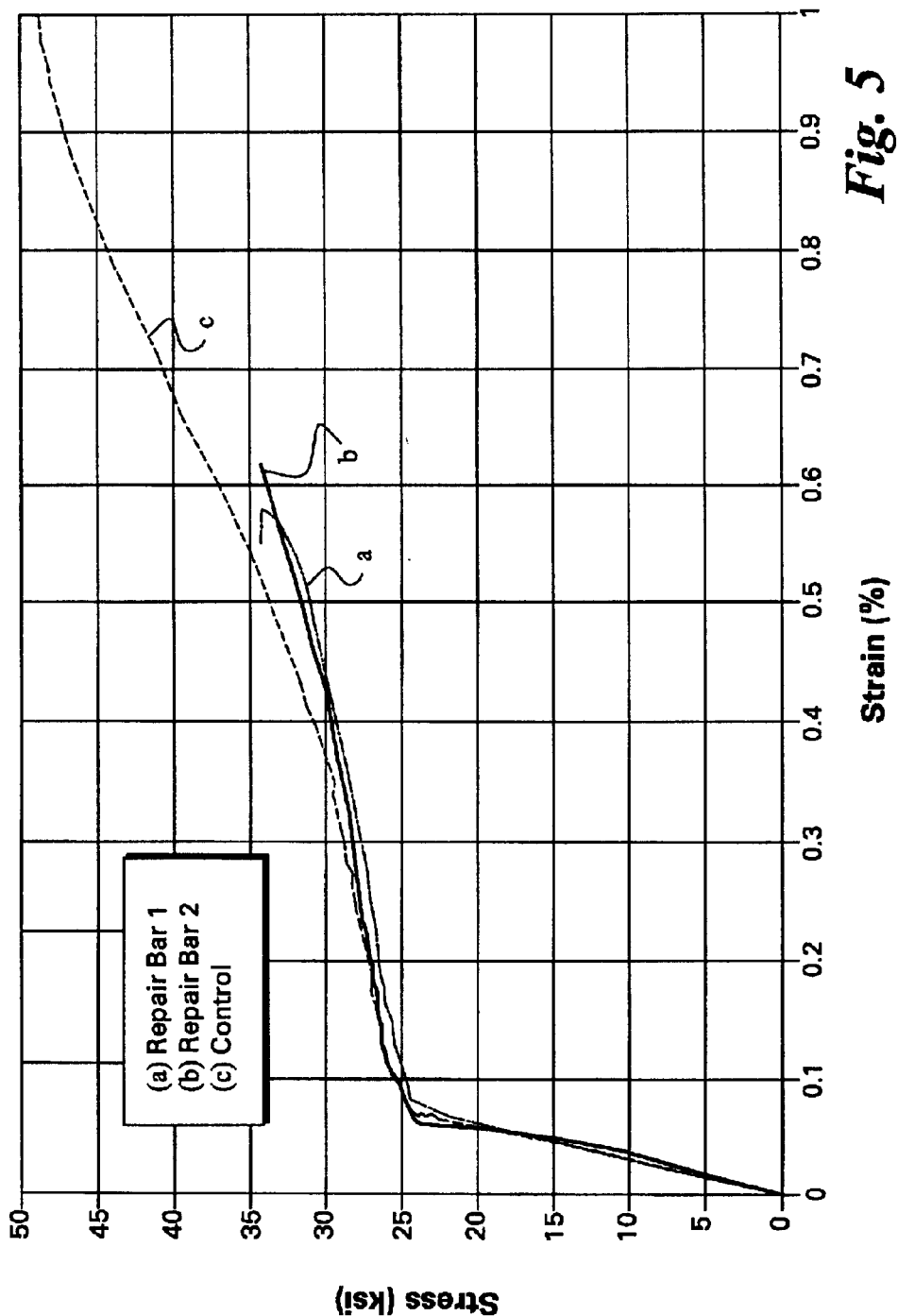
FIG. 5 shows the stress-strain curve of a CMC bar, which is made of melt-infiltrated prepreg Hi-Nicalon™ composite and repaired, with a plug of Hi-Nicalon™ prepreg tape.

Repair by Applying a Plug Patch of Hi-Nicalon™ Fiber-Reinforced Prepreg Tape to a Melt-Infiltrated Fiber-Reinforced Prepreg Hi-Nicalon™ Composite Substrate A tapered hole having a shape of an inverted prism, as shown in FIG. 2, was machined into a melt-infiltrated prepreg Hi-Nicalon™ SiC-in-SiC composite plate having a dimension of about 10 cm×2.5 cm×0.25 cm. The base of the hole had a large dimension of about 5 cm and a small dimension of about 0.8 cm. The hole was ground through the thickness of the plate. The wall of the hole was cleaned with acetone, and a thin layer of a paste prepared by mixing SiC and carbon powders with a phenolic resin and a binder was painted on the cleaned wall of the hole. The hole was then filled with layers of prepreg tape cut to appropriate dimensions. The patched CMC plate was subjected to a slow binder burnout up to about 750° C. as described in Example 1. A pack consisting of silicon, boron, and boron nitride powders was applied to the patch. The repaired patch was infiltrated with molten silicon at about 1425° C. for about 20 minutes in vacuum. The repaired plate was cut to produce two 11.2 cm×1.2 cm bars. Both bars were subjected to a tensile test. The stress-strain curve for the repaired bars is shown in FIG. 5 in comparison to the stress-strain curve of another intact bar that was cut from the same parent plate. The repaired bars showed a toughness behavior similar to that of the intact bar, as exhibited by the stress-strain curves.

EXAMPLE 4

Figure 6:
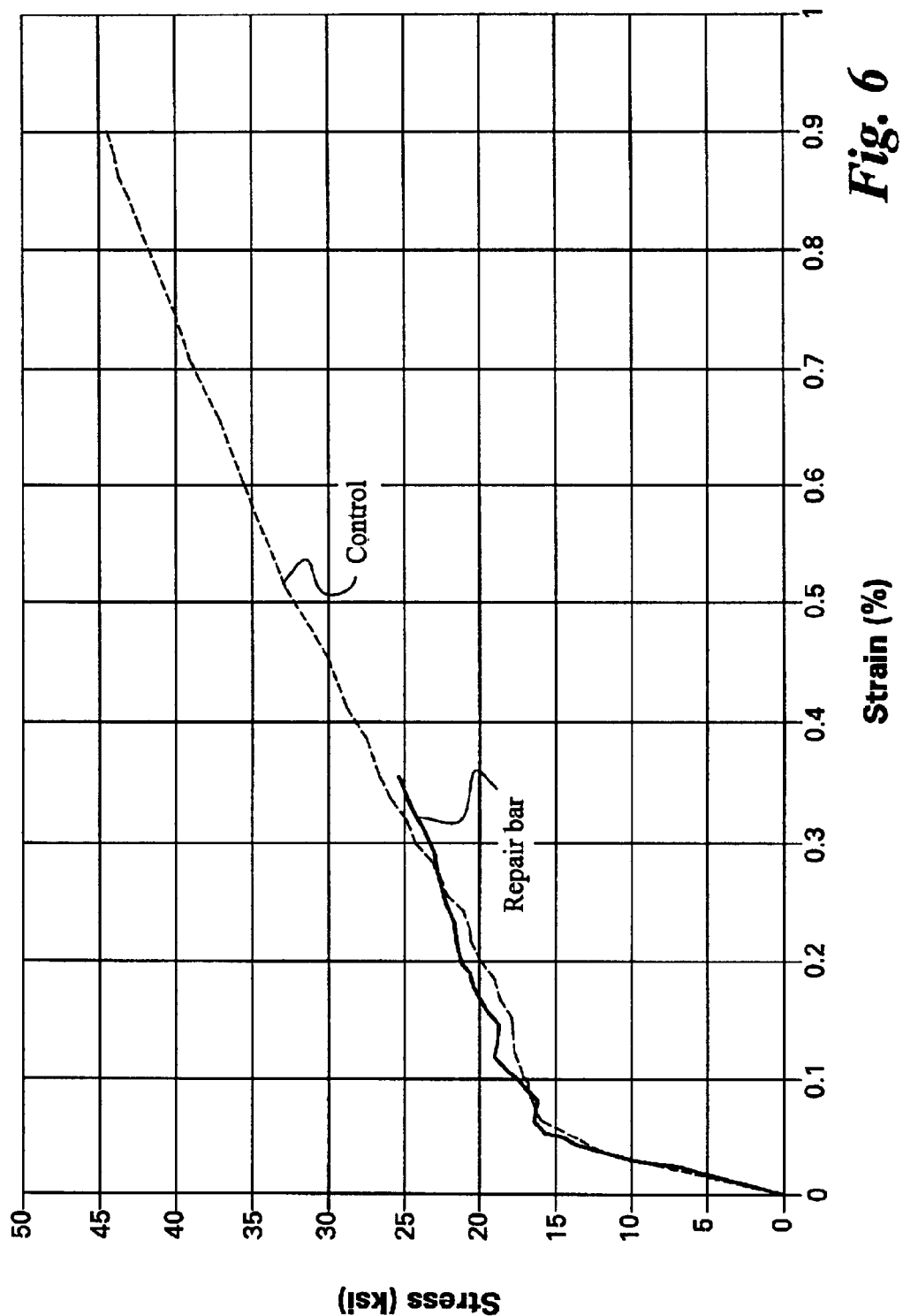
FIG. 6 shows the stress-strain curve of a CMC bar, which is made of melt-infiltrated slurry cast Tyranno-ZMI™ composite and repaired with a plug of Hi-Nicalon™ prepreg tape.

Repair by Applying a Plug Patch of Hi-Nicalon™ Fiber-Reinforced Prepreg Tape to a Melt-Infiltrated Slurry Cast Si—SiC Matrix Composite Reinforced with Tyranno-ZMI™ SiC Fibers A tapered hole similar to that shown in FIG. 2 having a shape of an inverted prism was machined into a melt-infiltrated slurry cast Tyranno-ZMI™ SiC—SiC composite plate having a dimension of about 10 cm×3.8 cm×0.25 cm. The base of the hole had a large dimension of about 5 cm and a small dimension of about 0.8 cm. The hole was ground through the thickness of the plate. The wall of the hole was cleaned with acetone, and a thin layer of a paste prepared by mixing SiC and carbon powder with a phenolic resin and a binder was painted on the cleaned wall of the hole. The hole was then filled with layers of prepreg tape cut to appropriate dimensions. The patched CMC plate was subjected to a slow binder burnout up to about 750° C. as described in Example 1. A pack consisting of silicon, boron, and boron nitride powders was applied to the patch. The repair patch was then infiltrated with molten silicon alloy by heating at about 1435° C. for about 30 minutes in vacuum. The repaired plate was cut to produce three 11.2 cm×1.2 cm bars. All three bars were subjected to a tensile test. The stress-strain curve for one of the repaired bars is shown in FIG. 6 in comparison to the stress-strain curve of another intact bar that was cut from the same parent plate. The repaired bar showed a toughness behavior similar to that of the intact bar, as exhibited by the similar stress-strain curves.

While various embodiments are describe herein, it will be appreciated from the specification that various combinations of elements, variations, equivalents, or improvements therein may be made by those skilled in the art, and are still within the scope of the invention as defined in the appended claims.

What is claimed is:

1. A method for repairing a damaged area of an article that comprises a fiber-reinforced ceramic matrix composite ("CMC") material, said method comprising:
    providing a repairing tape that comprises ceramic fibers and at least one matrix material selected from the group consisting of a ceramic matrix material, a ceramic matrix precursor material, and mixtures thereof;
    attaching at least a portion of said repairing tape to said damaged area of said article;
    providing an infiltrant phase material to said at least a portion of said repairing tape; said infiltrant phase material comprising a material selected from the group consisting of a ceramic matrix material, a ceramic matrix precursor material, and mixtures thereof; and
    infiltrating said at least a portion of said repairing tape with said infiltrant phase material.

2. The method for repairing a damaged area of an article according to claim 1, wherein said repairing tape is prepared by placing said ceramic fibers next to each other to form a sheet having at least one layer of fibers, and at least a portion of one matrix material is disposed among said fibers.

3. The method for repairing a damaged area of an article according to claim 1, wherein said repairing tape comprises continuous fibers which are arranged substantially in parallel to one another and on which at least a portion of said matrix material is adhered.

4. The method for repairing a damaged area of an article according to claim 3, wherein said repairing tape is formed by winding on a support said continuous fibers on which said at least a portion of said matrix material is adhered.

5. The method for repairing a damaged area of an article according to claim 1, wherein said repairing tape is prepared by casting a mixture that comprises sections of said ceramic fibers and said at least one matrix material into a tape.

6. The method for repairing a damaged area of an article according to claim 1 further comprising cleaning said damaged area before attaching said at least a portion of said prepreg tape to said damaged area.

7. The method for repairing a damaged area of an article according to claim 1 further comprising removing a portion of said CMC material from said damaged area to form a depression in said article before attaching said at least a portion of said repairing tape to said damaged area, wherein said attaching comprises filling said depression with a plurality of layers of said repairing tape.

8. The method for repairing a damaged area of an article according to claim 7, wherein said depression has a shape selected from the group consisting of an inverted cone, an inverted truncated cone, and a prism.

9. The method for repairing a damaged area of an article according to claim 1, wherein said ceramic fibers comprise silicon carbide.

10. The method for repairing a damaged area of an article according to claim 9, wherein said ceramic fibers comprise silicon carbide and a coating comprising a nitride compound disposed on said fibers.

11. The method for repairing a damaged area of an article according to claim 10, wherein said nitride compound is selected from the group consisting of boron nitride, silicon nitride, silicon-doped boron nitride, and mixtures thereof.

12. The method for repairing a damaged area of an article according to claim 11, wherein said fibers comprise a plurality of coatings, each of said coatings comprising a different nitride compound.

13. The method for repairing a damaged area of an article according to claim 10, wherein said coating of said ceramic fibers has a graded composition across a thickness thereof.

14. The method for repairing a damaged area of an article according to claim 10, wherein said ceramic fibers further comprise at least another coating comprising a material selected from the group consisting of carbon, metal silicides, metal carbides, and metal borides.

15. The method for repairing a damaged area of an article according to claim 1, wherein said matrix material comprises a material selected from silicon and silicon carbide.

16. The method for repairing a damaged area of an article according to claim 1, wherein said infiltrant phase material is selected from the group consisting of silicon and silicon carbide.

17. The method for repairing a damaged area of an article according to claim 1, wherein said infiltrating is carried out by a melt infiltration.

18. The method for repairing a damaged area of an article according to claim 17, wherein said infiltrant phase material is silicon.

19. The method for repairing a damaged area of an article according to claim 17, wherein said infiltrating is carried out at a temperature up to and including an infiltration temperature used in an original manufacture of said article.

20. The method for repairing a damaged area of an article according to claim 17, wherein said infiltrating is carried out at a temperature from about 15° C. to about 20° C. less than an infiltration temperature used in an original manufacture of said article.

21. The method for repairing a damaged area of an article according to claim 20, wherein said infiltrating is carried out under an atmosphere of an inert gas.

22. The method for repairing a damaged area of an article according to claim 21, wherein said inert gas is selected from the group consisting of argon, helium, and mixtures thereof.

23. The method for repairing a damaged area of an article according to claim 19, wherein said infiltrating is carried out in a vacuum.

24. The method for repairing a damaged area of an article according to claim 23, wherein said vacuum is in a range from about 1 Pa to about 300 Pa.

25. The method for repairing a damaged area of an article according to claim 23, wherein said vacuum is from about 2 Pa to about 150 Pa.

26. The method for repairing a damaged area of an article according to claim 1, wherein said infiltrating is carried out by a chemical vapor deposition of said infiltrant phase material.

27. The method for repairing a damaged area of an article according to claim 1, wherein said infiltrating comprises infiltrating a melt of a precursor of said infiltrant phase material followed by pyrolyzing said precursor to form said infiltrant phase.

28. The method for repairing a damaged area of an article according to claim 1, wherein said infiltrant phase material comprises silicon and carbon.

29. The method for repairing a damaged area of an article according to claim 1, wherein said article is selected from the group consisting of combustion chamber liners, combinations of combustion liners and transition pieces, nozzles, shroud rings, vanes, buckets, and blades.

30. A method for repairing a damaged area of an article that comprises a fiber-reinforced CMC material, said method comprising:

providing a repairing tape that comprises ceramic fibers and at least one matrix material selected from the group consisting of a ceramic matrix material, a ceramic matrix precursor material, and mixtures thereof;

removing a portion of said CMC material from said damaged area to form a depression in said article, said depression having a shape selected from the group consisting of an inverted cone, an inverted truncated cone, and a prism having a base on a surface of said article;

filling said depression with a plurality of portions of said repairing tape;

providing an infiltrant phase material to said portions of said repairing tape;

said infiltrant phase material comprising at least a material selected from the group consisting of a ceramic matrix material, a ceramic matrix precursor material, and mixtures thereof; and infiltrating said portions of said repairing tape with said infiltrant phase material.

31. A method for repairing a damaged area of an article that comprises a fiber-reinforced CMC material, said method comprising:

providing a repairing tape that comprises ceramic fibers and at least one matrix material selected from the group consisting of a ceramic matrix material, a ceramic matrix precursor material, and mixtures thereof;

cleaning a portion of a surface of said article around said damaged area to provide a cleaned surface;

attaching at least a portion of said repairing tape to said cleaned surface;

providing an infiltrant phase material to said at least a portion of said repairing tape; said infiltrant phase material comprising at least a material selected from the group consisting of a ceramic matrix material, a ceramic matrix precursor material, and mixtures thereof; and infiltrating said at least a portion of said repairing tape with said infiltrant phase material.

32. The method for repairing a damaged area of an article according to claim 31, said method further comprising attaching portions of said repairing tape to a wall of said depression before filling said depression with a plurality of portions of said repairing tape; wherein said ceramic fibers are silicon carbide fibers, and said matrix material and said infiltrant phase material comprise silicon and carbon.

33. The method for repairing a damaged area of an article according to claim 31, said method further comprising applying a layer of a material selected from ceramic matrix material, ceramic matrix precursor material, and mixtures thereof to a wall of said depression before filling said depression with a plurality of portions of said repairing tape.

34. The method for repairing a damaged area of an article according to claim 31, wherein said cleaning is carried out by heating said article in a reducing atmosphere.

35. The method for repairing a damaged area of an article according to claim 34, wherein said reducing atmosphere comprises a gas selected from the group consisting of hydrogen, carbon monoxide, and mixtures thereof with an inert gas.

36. The method for repairing a damaged area of an article according to claim 31, said method further comprising painting walls of said depression with a mixture comprising sections of said ceramic fibers and said at least one matrix material.

\* \* \* \* \*